Figure 1:
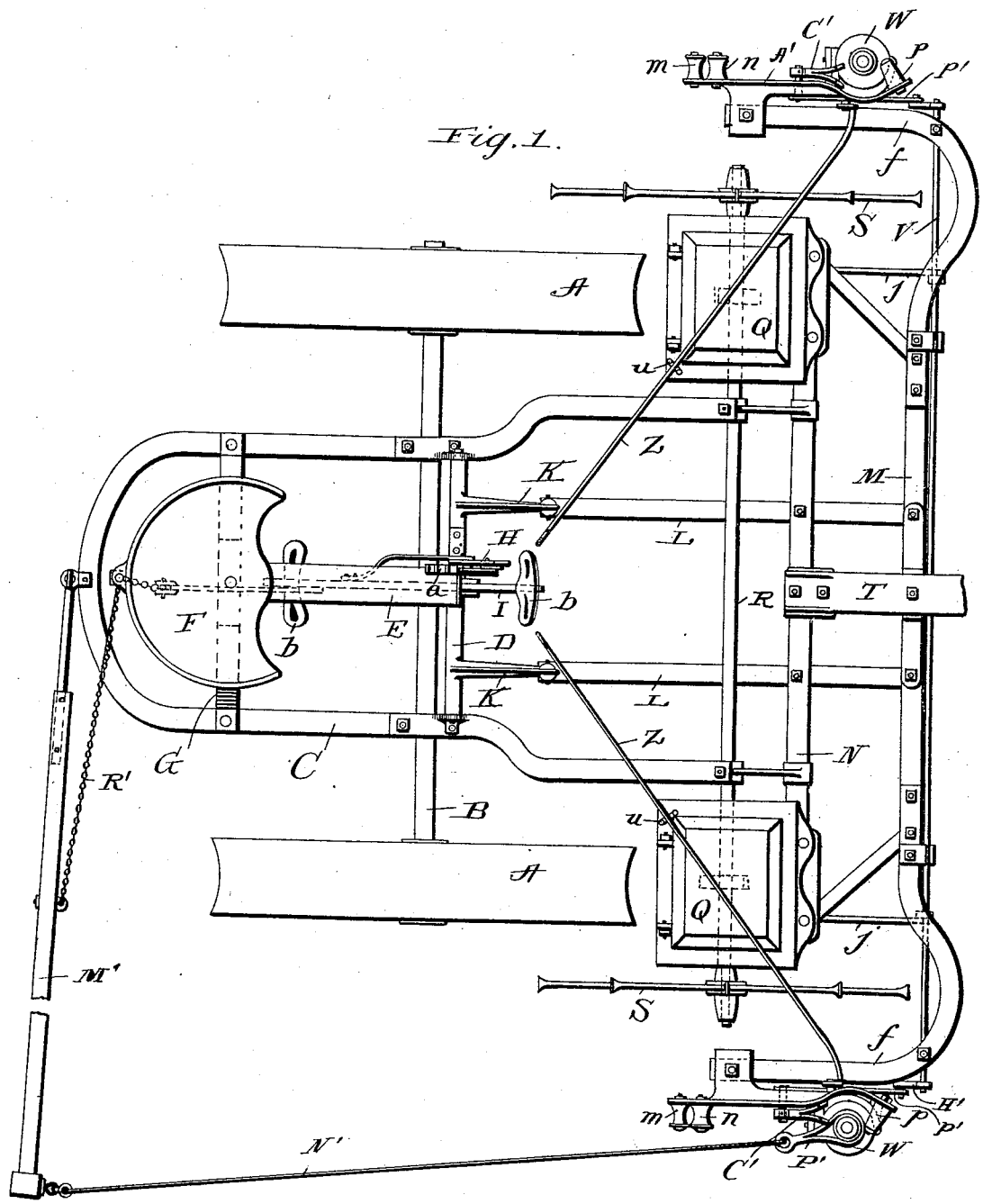

(No Model.)

4 Sheets—Sheet 1.

J. W. PARKER.
CHECK ROW CORN PLANTER.

No. 520,862.  Patented June 5, 1894.

Witnesses:
C. H. Raeder
K. F. Matthews.

Inventor
J. W. Parker
By James J. Sheehy
Attorney

THE NATIONAL LITHOGRAPHING COMPANY,
WASHINGTON, D. C.

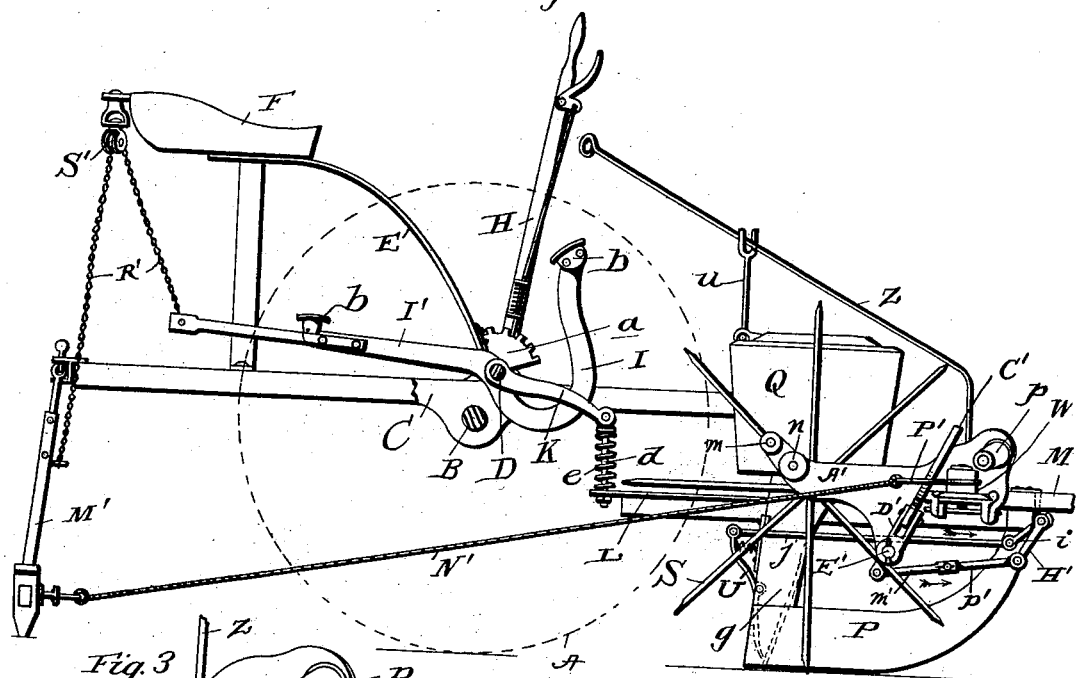

(No Model.)　　　　　　J. W. PARKER.　　　4 Sheets—Sheet 3.
CHECK ROW CORN PLANTER.
No. 520,862.　　　　　　　　　Patented June 5, 1894.
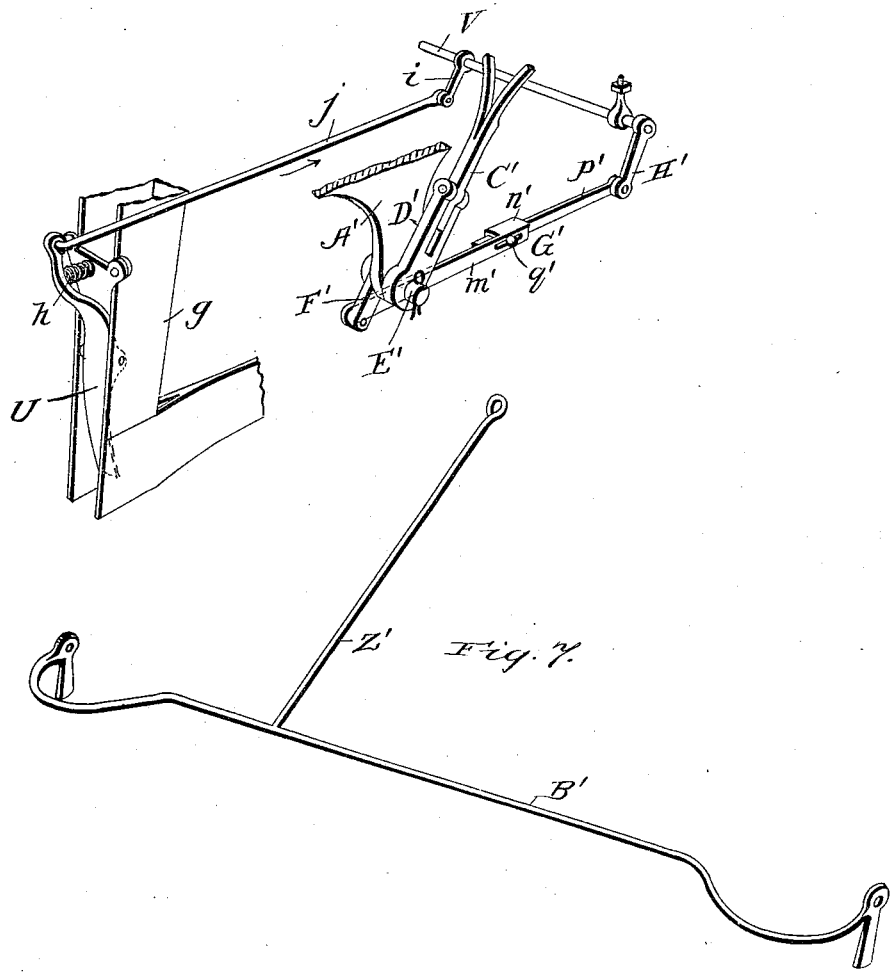

(No Model.)
J. W. PARKER.
CHECK ROW CORN PLANTER.
No. 520,862.
4 Sheets—Sheet 4.
Patented June 5, 1894.
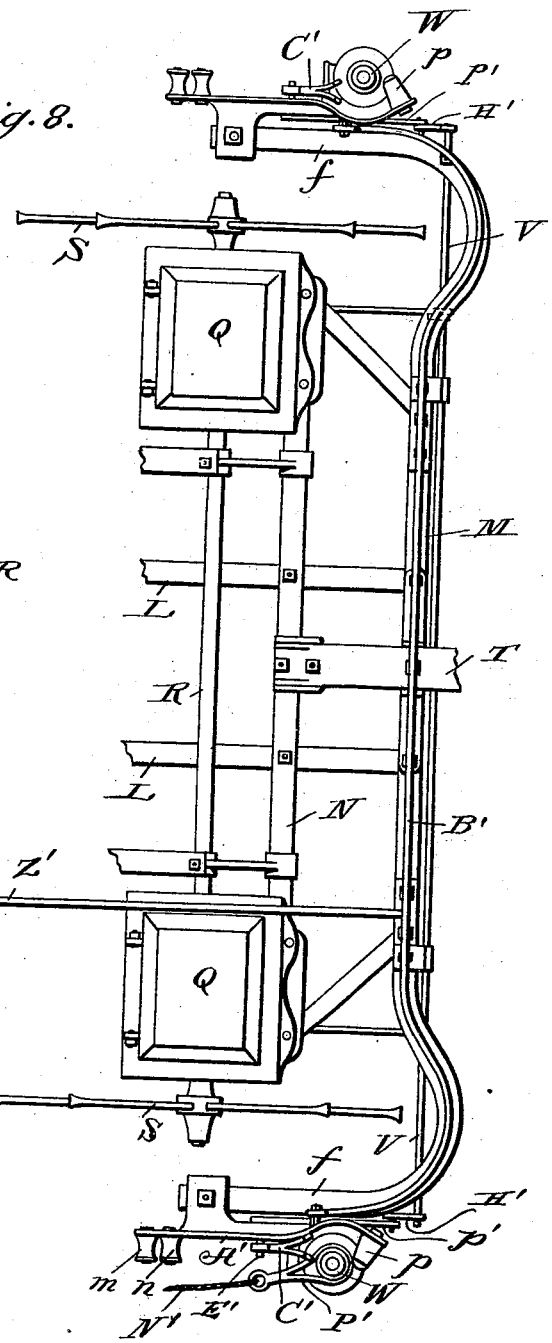
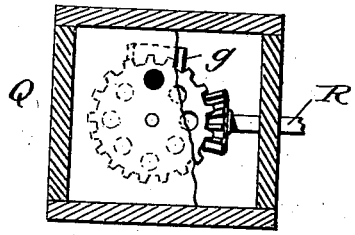

UNITED STATES PATENT OFFICE.

JAMES WILDER PARKER, OF VIOLA, ILLINOIS.

CHECK-ROW CORN-PLANTER.

SPECIFICATION forming part of Letters Patent No. 520,862, dated June 5, 1894.

Application filed December 18, 1893. Serial No. 493,918. (No model.)

*To all whom it may concern:*

Be it known that I, JAMES WILDER PARKER, a citizen of the United States, residing at Viola, in the county of Mercer and State of Illinois, have invented certain new and useful Improvements in Check-Row Corn-Planters; and I do declare the following to be a full, clear, and exact description of the invention, such as will enable others skilled in the art to which it appertains to make and use the same.

My invention relates to improvements in check row corn planters, and its novelty will be fully understood from the following description and claims when taken in connection with the annexed drawings, in which—

Figure 1, is a plan view of my improved planter complete. Fig. 2, is a side elevation of the same with parts removed. Fig. 3, is an enlarged detail elevation of the check row wire dumping sheave and connected parts. Fig. 4, is a reverse view of Fig. 3, illustrating the gravitating latch for holding the dumping sheave in its normal position. Fig. 5, is an enlarged detail transverse section taken through the dumping sheave and its supporting frame; the dumper position of the sheave being illustrated by dotted lines. Fig. 6, is a detail, enlarged, perspective view of the seed dropping mechanism. Fig. 7, is a perspective view illustrating a modified mechanism for releasing the sheave and dumping the check row wire. Fig. 8, is a detail view illustrating such modified mechanism in its operative position, and Fig. 9, is a detail view illustrating a portion of one of the seed boxes together with the rotary seed discharging disk therein.

Referring by letter to said drawings:—A, indicates the ordinary covering and traveling wheels, one of which may be fast and the other loose upon the axle B, journaled in boxes bolted to the under side of an approximately U-shaped bar C, projecting both in front and in rear of the axle about equal distances and with the open end of the "U" forward. This bar C, constitutes the main frame of the machine and supports the raising and lowering mechanism for the runner frame, and the driver's seat.

Journaled in suitable bearings upon the frame C, and extending transverse of the same just above and slightly in advance of the axle is a shaft D. The seat bow E, carrying the driver's seat F, and supported at its rear by the bar G, whose lower ends are secured to the bar C, may be connected to a box on the shaft D, thereby throwing the weight of the driver entirely upon the frame C, and upon the axle at two points near the wheels, instead of upon the center of the axle, where the weight might cause the axle to bend.

Fixed upon the shaft D, at one side is a hand lock lever H, whose detent engages with a toothed segment a, fixed with respect to the frame C. Also fixed upon the shaft D, at the middle thereof is the double foot lever I, I', extending up in front and rear of the shaft D, with cross foot rests b, at each end. The box upon the shaft D to which the seat bow E, is connected, is preferably so formed as to straddle the foot lever I, I', without interfering with its vibration and the rocking of the shaft D, as will be readily understood. Also fixed on the shaft D, inside of the frame C, are two forwardly extending arms K, to form the double connection with the runner frame by means of pivoted rods d, whose lower ends pass through perforations in the rearwardly extending bars L, of the runner frame and are secured in any approved manner. Coiled springs e, surround the rods d, as shown for the usual well known purpose.

The forward seeding and runner frame is constructed as follows: There is a forward bar M, which is provided at its ends with the curved and rearwardly extending arms f, and a second bar N, both of which bars are parallel to the axle and have secured to them the two rearwardly extending bars L.

P, indicates the runners of the usual or any suitable construction whose forward ends are connected to the bar M, and upon whose shanks g, and the bar N, are secured the feed boxes or hoppers Q, which contain rotary seed dropping plates or disks. Other seed discharge mechanism, which may be actuated by the transverse shaft R, through the medium of suitable interposed gearing may be used if desired. The said shaft R, is provided upon its ends which extend beyond the seed boxes Q, as shown, with star wheels S, which are designed to engage the ground and thereby rotate the shaft R, for the purpose before stated. These wheels S, rest in the spaces between the arms f, of the bar M, and the seed boxes as better shown in Fig. 1; and by reason of the spaces afforded by the provision of the said arms f, it will be perceived that either one of the wheels S, may be removed and a suitable reel (not illustrated) may be mounted upon the shaft R, in lieu thereof, when it is desired to wind the check row wire.

When the wire reel is mounted upon the shaft R, in the manner just described, it will be perceived that the remaining star wheel S, engaging the ground will serve to positively rotate the reel, thus dispensing with any gearing intermediate of the axle and reel. It will also be perceived that by reason of the wire reel being mounted upon the shaft R, the necessity of providing a separate frame for the said reel, which would add to the weight of the planter, is obviated, which is an important desideratum.

The pole T, is bolted to the bars M, and N, of the runner frame as shown in Fig. 1, and the said runner frame, constructed in the manner hereinbefore described, has its bar N, connected with the forward ends of the bars C, in a hinged manner, substantially as shown.

By reference to Figs. 2, and 6, my preferred form of valve mechanism for the spouts in the shanks g, will be understood from the following description: In each spout there is a pivoted valve U, constituting the back wall of the spout and normally closing the same near the ground under the action of a suitable spring h, which exerts a pressure against the upper end of the valve, as shown. To open the valve to deposit the desired number of grains in a hill or row, the transverse shaft V, which is journaled in bearings connected to the bar M, and is provided with cranks i, connected with the upper ends of the valves by pitmen j, is rocked in the direction indicated by arrow, by the check-row mechanism. The said check row mechanism is illustrated in Figs. 1, to 6, where A', is a metal bar or frame bolted to the arms f, of the bar M, and provided with the usual guide rollers m, n, p, and the vertical dumping sheave W, which is journaled upon a plate X, having pendent side lugs q, pivoted as at r, between lugs s, projecting from the frame A'. One of the lugs q, of the plate X, is provided with a toe t, as better illustrated in Fig. 5, and this toe which extends through a slot in the bar or frame A', is designed to be engaged by the gravitating latch Y, which serves to retain the plate X, in the position shown in Fig. 5, and the sheave in its normal operative position. The gravitating latches Y, may be swung out of their normal pendent positions to release the plate X, and dump the sheave W, by the handles Z, which are connected to the latches and extend rearwardly within convenient reach of the driver and which are designed to normally bear in suitable uprights u, rising from the seed boxes Q, as shown; or such movement of the latches Y, may be effected through the medium of the crank shaft B', and the handle or lever Z'. (Illustrated in Fig. 7.) When the crank shaft and lever are employed, the shaft which has its end portions bowed or curved, as shown, extends transverse of the runner frame and is connected to the latches as shown, and the lever Z', which is fixedly connected to the shaft extends back within convenient reach of the driver.

By reason of the latches Y, being gravitating, it will be perceived that they will automatically assume a pendent position to lock the plates X, and sheave W, in position, and that they will remain in such position without the aid of springs and the like, which are liable to get out of order.

C', indicates the usual forked tappet pivoted (so as to swing outward and dump the cable when the sheaves W, drop for the same purpose), to an arm D', mounted upon a short shaft E', journaled in the frame A', as shown. The short rock shaft E', is provided with a fixed arm F', and this arm is connected by the sectional link G', to an arm H', fast upon the rock shaft V, whereby it will be seen that when the tappet fork is thrown rearwardly by the knobs of the check row wire, the valves U, will be opened to permit the corn to drop into the hills or rows. The link G', comprises the section m', which is connected to the crank arm F', and is slotted and provided at its free end with a sleeve as n', the section p', which is connected to the arm H', and the screw q', which takes through the slot in the section m', and the section p', and serves to adjustably connect said sections together. By reason of this adjustable connection of the sections of the link G', it will be readily perceived that the link may be conveniently lengthened and shortened to meet various conditions.

M', indicates the laterally extending drag marker which is connected in a swiveled manner to the rear end of the frame C, and has its outer end connected with the dumping sheave W, by the rope or chain N', and the loop or eye P', at the forward end of said chain, which loop or eye is designed to take loosely over the sheave W, so that when said sheave is dumped at the end of a field, the loop or eye will be automatically released to permit the drag marker being swung over to the other side of the planter. The said marker M', may be and preferably is raised in concert with the runner frame by the lever I', through the medium of the chain R', which takes through a pulley S', connected in a swiveled manner to the seat F, and is connected at its outer end to the drag marker at an intermediate point of its length. In some cases a suitable hand lever might be mounted upon the shaft D, and connected with the drag marker to raise the same, but I prefer in practice to utilize the lever I′, since it is always desirable to raise the drag marker when the runner frame is raised.

It will be seen from the foregoing description taken in connection with the drawings that my improved planter is very simple and light; that it embodies no parts that are likely to get out of order; and that it is unnecessary for the driver to leave his seat in making a turn since he may conveniently raise the runner frame and drag marker with his foot and discharge the check row wire with one of his hands.

While I have specifically described the construction and relative arrangement of the several elements of my improved planter, in order to impart a full and clear understanding of the same, I do not desire to be understood as confining myself to such specific construction and arrangement as such changes or modifications may be made as fairly fall within the scope of my invention.

Having described my invention, what I claim is—

1. In a check row corn planter, the combination of a runner frame, a frame as A′, connected therewith, a plate pivotally connected to the frame A′, and having a pendent lug provided with a toe, a dumping sheave journaled on the plate, a gravitating latch adapted to engage the toe of the lug and hold the plate and dumping sheave in their normal operative position, and a handle formed integral with the gravitating latch and extending to a point within convenient reach of the driver, substantially as specified.

2. In a check row corn planter, the combination of frames as A′, plates pivotally connected to the frames and having pendent lugs provided with toes, dumping sheaves journaled on the plates, gravitating latches adapted to engage the toes of the lugs and hold the plates and the dumping sheaves in their normal operative positions, a shaft as B′, having its ends curved or bowed and connected to the latches, and a lever fixed on said shaft B′, substantially as specified.

3. In a check row corn planter, the combination with a main frame, a frame as A′, a plate pivotally connected to the frame A′, a dumping sheave journaled on the plate, and a suitable means for holding the plate and the dumping sheave in their operative position, and for releasing them so as to dump the check row wire; of a drag marker connected to the main frame, a cord or chain connected at one end to the outer end of the drag marker, and a loop or eye connected to the opposite end of said cord or chain and adapted to take over the dumping sheave, substantially as and for the purpose specified.

4. In a check row corn planter, the combination of a main frame, a movable runner frame connected therewith, a rock shaft as D, journaled in the main frame and having forwardly extending arms connected with the runner frame, the double lever I, I′, fixed on the shaft D, the drag marker connected by the main frame, a chain taking over a pulley carried by the main frame, and having one end connected to the lever I′, and its opposite end connected to the drag marker at an intermediate point in the length thereof, a frame as A′, connected with the runner frame, a plate pivotally connected to the frame A′, and carrying a dumping sheave, a suitable means for holding the plate and the dumping sheave in their operative position and for releasing them so as to dump the check row wire, a cord or chain connected at one end to the outer end of the drag marker, and a loop or eye carried by the opposite end of said cord or chain, and adapted to take over the dumping sheave, all substantially as and for the purpose set forth.

5. In a corn planter, the combination of a runner frame comprising a transverse bar M, having the curved and rearwardly extending arms f, seed boxes mounted on the runner frame and provided with rotary seed discharging disks, a rotary shaft as R, journaled beneath the seed boxes, gearing intermediate of the said shaft and the rotary disks, and stellated wheels mounted on the shaft R, and resting between the rearwardly extended arms of the bar M, and the seed boxes all substantially as and for the purpose set forth.

In testimony whereof I affix my signature in presence of two witnesses.

JAMES WILDER PARKER.

Witnesses:
JOHN B. LONGLEY,
SMITH A. HUNTING.